(No Model.) 3 Sheets—Sheet 1.
B. JACKSON.
HORSE HAY RAKE AND CARRIER.
No. 340,122. Patented Apr. 20, 1886.
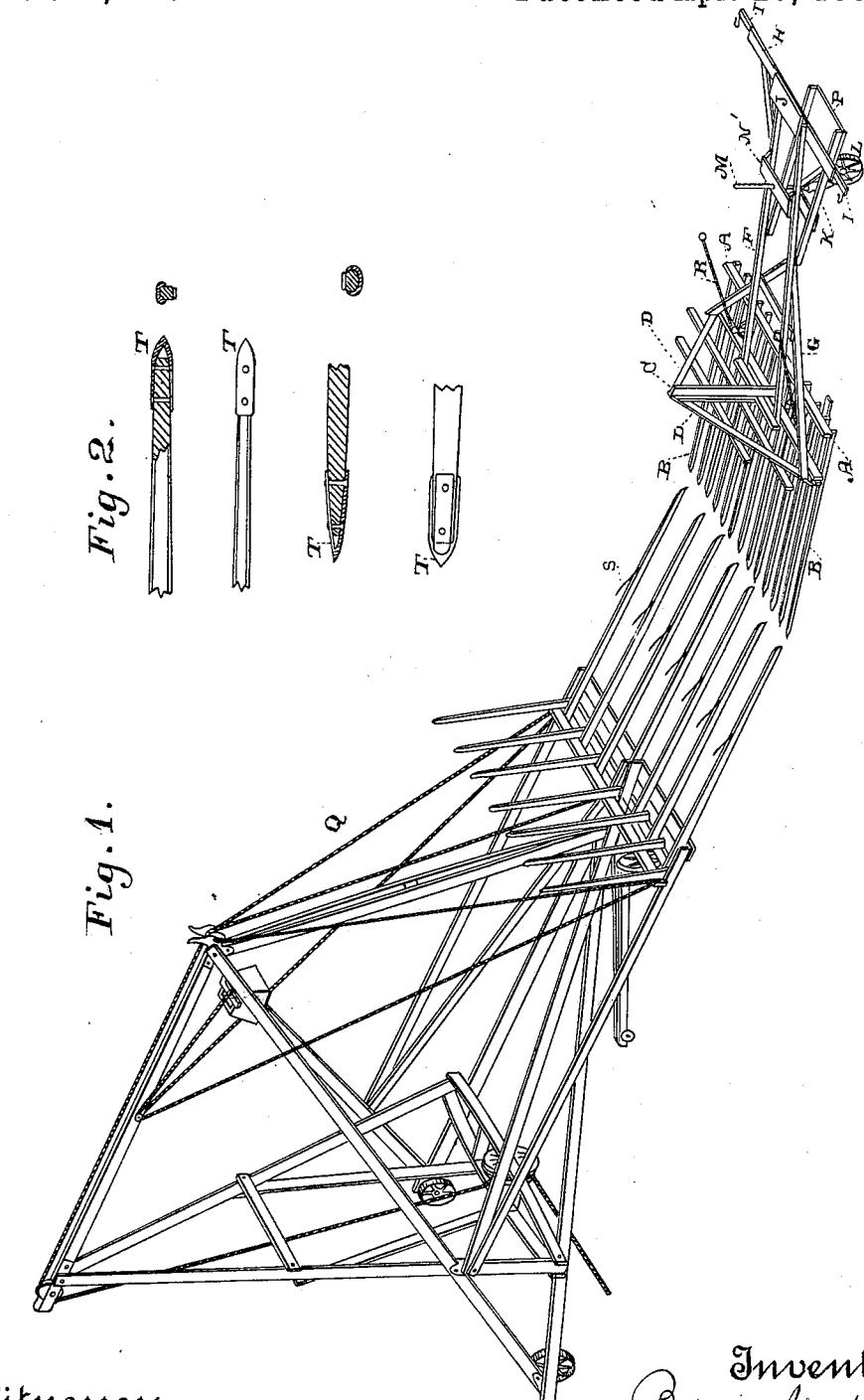

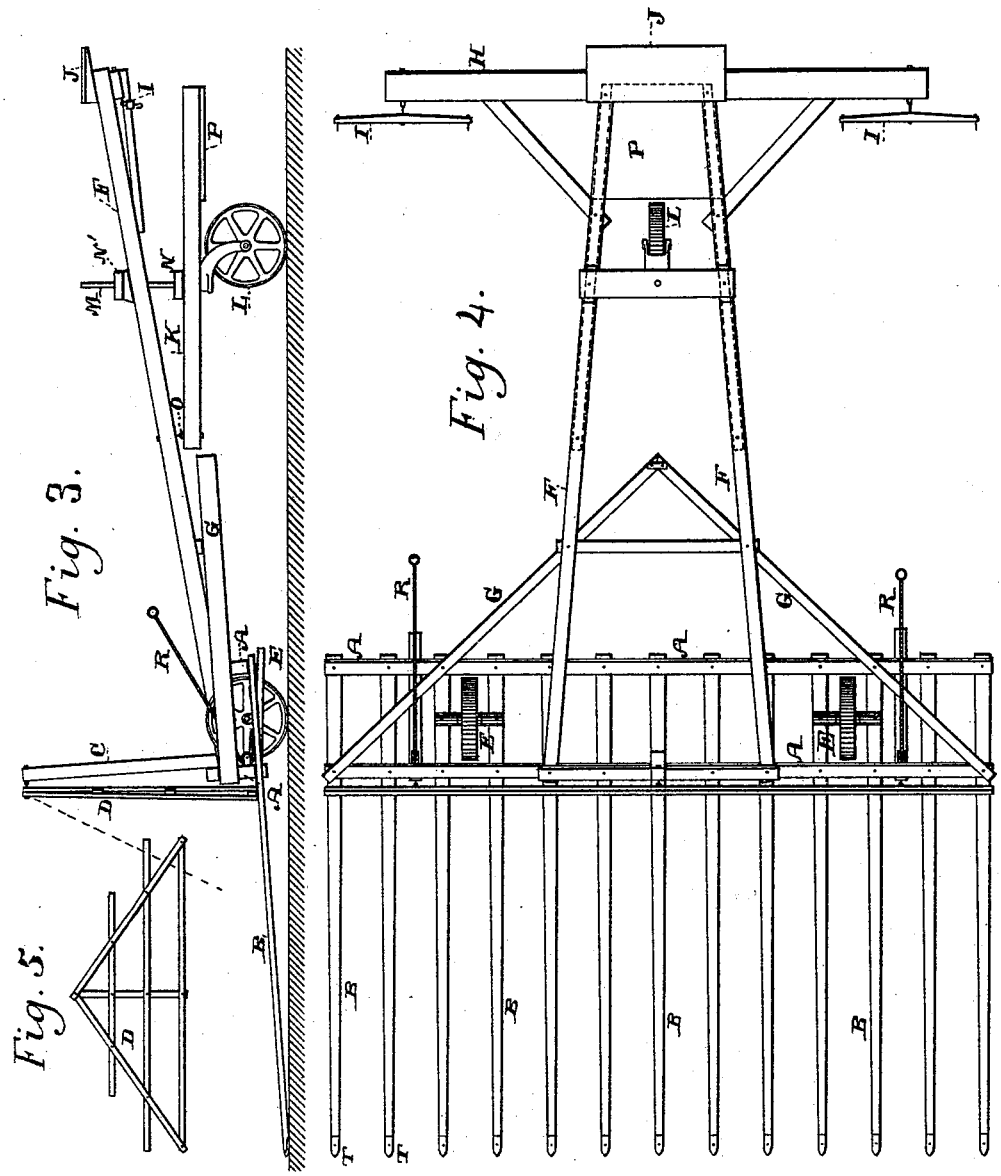

(No Model.) 3 Sheets—Sheet 3.

B. JACKSON.
HORSE HAY RAKE AND CARRIER.

No. 340,122. Patented Apr. 20, 1886.

UNITED STATES PATENT OFFICE.

BYRON JACKSON, OF SAN FRANCISCO, CALIFORNIA.

HORSE HAY RAKE AND CARRIER.

SPECIFICATION forming part of Letters Patent No. 340,122, dated April 20, 1886.

Application filed October 27, 1884. Serial No. 146,608. (No model.)

*To all whom it may concern:*

Be it known that I, BYRON JACKSON, of the city and county of San Francisco, and State of California, have invented an Improvement in Horse Hay Rakes and Carriers; and I hereby declare the following to be a full, clear, and exact description thereof.

My invention relates to an apparatus for gathering hay or grain and carrying it to a ricking or stacking apparatus or other point of deposit.

It consists of a frame-work mounted upon wheels, having long teeth or fingers projecting toward the front, a pushing and riding extension to the rear of said frame, with a supporting-wheel hinged to said rigid extension, so that the rider may depress the points of the teeth by standing on the hinged wheel-lever until a load is gathered, when, by sitting on the stiff lever, his weight will raise the points, and balance the load, and carry it on the wheels; means for attaching horses to the frame or the extension independent of each other, so that they can steer the rake without a rudder or tiller wheel, and a swinging rack or frame suspended above the rear of the rake-teeth or fingers, having ropes connected with them and with the backing-strap of the harness, so that the load may be discharged from the rake and in a compact mass.

It also consists in tips or shoes by which the teeth or fingers of the rake are prevented from splitting or breaking, and in a means for holding the hay or straw in place when being discharged from the rake, all of which will be more fully explained by referring to the accompanying drawings, in which—

Figure 6:
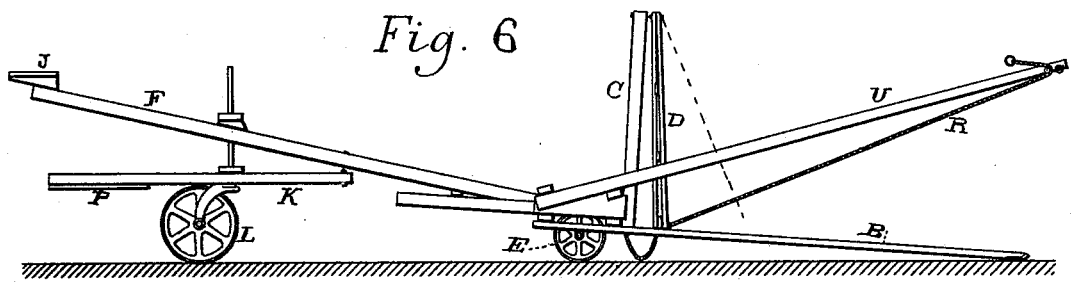
Figure 7:
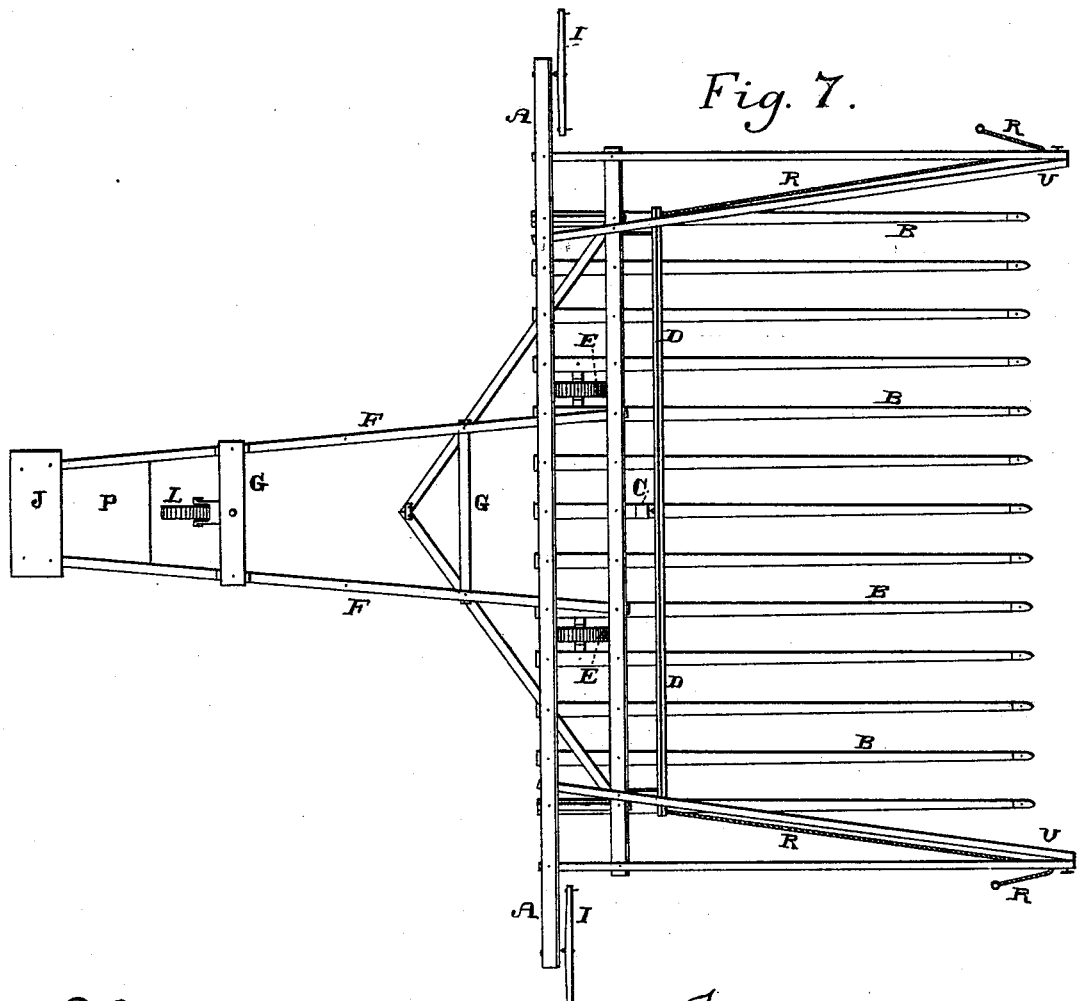

Figure 1, Sheet 1, is a perspective view of the ricking apparatus and rake, showing the detaining-barb on the top of ricker-fork tooth. Fig. 2 shows enlarged sectional views of the teeth. Fig. 3, Sheet 2, is a side elevation of my rake, and shows the pushing and riding and raising and lowering devices. Fig. 4 is a plan view showing the rake and the attachments for the horses on the outer ends of the pushing and riding beam at the rear of the extension-lever. Fig. 5 is a view of the swinging frame by which the hay is discharged from the rake. Fig. 6, Sheet 3, is a side elevation of the rake arranged for the attachment of the horses upon each end of the rake-head. Fig. 7 is a plan view of the same.

In gathering hay or straw to be stacked or conveyed to any certain point it is customary to use what is known as a "horse rake and carrier." In my invention I have made certain improvements in this apparatus, which I will now proceed to describe.

A A is a horizontal frame-work or timbers having long fingers or teeth B extending outward toward the front, for the purpose of gathering or collecting the hay or straw. A vertical post, C, extends upwardly from the rear portion of this rake, and a triangular frame-work, D, has its apex hinged to the top of the post, so that its lower horizontal side may swing outward or inward just above the rear surface of the teeth B; or a sliding frame may be made to answer the same purpose.

The rake A B is supported upon wheels E, and it has a rigid lever or arms, F, extending backward in the rear of the rake to a considerable distance, with suitable braces, G, by which the whole will be united, so as to form a rigid structure. These timbers F incline upward and backward from the rake, and have a transverse timber, H, extending across the rear and braced to the push-timbers with whiffletrees I, for the attachment of the team, connected with the outer ends of this transverse bar.

Upon the rear end of the lever F is fixed a board or seat, J, for the use of the driver. Beneath the timbers F another frame or lever, composed of timbers K, is supported by a caster-wheel, L, which has a vertical stem, M, extending up through cross-timbers N and N', by which it is steadied. The front ends of the frame-timbers K are hinged beneath the timbers F, as shown at O, and a board or platform, P, extends across between the rear ends of these timbers, so that the driver or operator may support his weight upon this platform or upon the seat J.

By this construction, when it is desired to raise the teeth of the rake from the ground it may be done by the operator resting his weight upon the seat J, which depresses the rear ends of the lever-arms F about the wheels E, which thus act as a fulcrum, so that the front ends of the teeth may be raised from the ground. When it is desired to depress the teeth, the driver rests his weight upon the platform P of the frame-work K, thus causing this frame-work to act as a lever moving about the wheel L as a fulcrum, and it acts upon the frame-timbers F, so as to raise the rear end and depress the front end and the teeth B.

By this construction, with the team attached, each horse independent of the other at the end of the bar H, as before described, it is possible to guide the apparatus with greater exactness to any point which may be desired, without the use of a tiller to turn the wheel L. When a sufficient amount of hay or straw has been gathered upon the teeth B, it is carried to any point where it is desired to deposit it.

In the present case I have shown a ricking or stacking apparatus at Q, Fig. 1, with the teeth or fingers upon which the hay or straw are deposited by the rake.

This apparatus forms the subject of a former application, Serial No. 141,503, filed August 26, 1884, for a patent which I have made, and which is not claimed in this invention, but is shown for the purpose of illustrating the relative position of the rake to it.

When the rake has been driven up so that its teeth or fingers interlace with those of the ricking apparatus, the hay or straw is deposited upon the teeth of the ricker, ready to be lifted by it and deposited upon the stack. The rake is then withdrawn from the ricking apparatus by backing the team in order to deposit the hay or straw upon the teeth of the ricker. In order to prevent its being withdrawn by the backward movement of the rake, the swinging frame D has ropes R so connected with it and with the backing-strap or other part of the harness that when the team is backing the ropes R will act to force the bottom of the swinging frame D forward, and thus press the hay or straw into its place on the fingers of the ricker.

Barbs S upon the top of the ricker-teeth prevent its being withdrawn by the backward movement of the rake. In order to prevent these teeth or fingers from being split as the rake is driven up, so that its teeth interlace with the ricker, I employ metallic points or shoes T, which are fixed to the ends of the wooden rake and ricker-teeth, as shown. If the teeth of the rake then happen to come in contact with the ends of the ricker-teeth, they will pass by each other and not be split or broken.

Another advantage is that the metallic points, being pointed or curved upward from the lower side, will prevent the teeth of the rake from being forced into the ground when passing over irregular surfaces; or, if they do enter a short distance, the upward curve from below will throw them out again.

By this construction I am enabled to make the teeth of pine or soft wood, which is less expensive than hard wood, and the shoes or points will prevent their being split or broken while at work.

In Figs. 6 and 7 I have shown how the team may be hitched—one horse at each end of the rake-head, as is usual with the common buck-rake—by extending the rear timber and attaching the whiffletrees to it, and extending a tongue or frame, to which is hitched the pulley and backing-strap, and the swinging frame D is operated by the ropes R, as before described, operating the rake in all other respects the same as if the team pushed the rake in front of them, as before described.

It is usual in this class of combined rake and carrier to hitch the horses at the end, as shown in Fig. 7, because it was not thought possible to push it from behind and steer it from behind without the use of a rudder or steering-wheel controlled by the driver; but I discovered that by framing the draft-bar H rigid with the pushing-frame, the team could control the rake quicker than when hitched at the end, and the driver had better control of the team, because he was closer to them; besides, it is very desirable to keep the team from walking on the unraked hay or grain, or that which will always project from the load at each end of the rake. I discovered, also, that by framing the draft-bearer and pushing-lever stiff with the rake-frame it gave the driver quicker and easier control of the rake than if guided by any rudder or wheel steering apparatus, because he could ride on the controlling-lever, combining his weight with that of the draft-bar and pushing tongue or frame to carry the load, and when desiring to depress the teeth to gather the load he has only to stand on his feet, instead of lifting the controlling-lever by hand, as he would have to do if the rake were steered by a rudder-wheel; besides the rake is always free to work about the axles of the carrying-wheels, so the points will fit the uneven ground, and the points of the teeth are forced downward by the weight of the driver sufficiently to spring the large teeth to gather the hay from the depressions and fit the points of the teeth to the uneven ground. This plan of making the push-tongue and draft-bar rigid with the rake-frame is much stronger, lighter, and cheaper than to attach a rudder or sulky-steering apparatus.

Having thus described my invention, what I claim as new, and desire to secure by Letters Patent, is—

1. A horse-rake mounted upon wheels, having a rearwardly-extending frame rigidly connected with it and a seat upon the rear end of this frame, in combination with a supplemental frame having its front end hinged to the main frame, and consisting of the timbers K and the cross-timbers N N′, a caster-wheel supporting the center of the supplemental frame, and provided with a stem which passes through the cross-timbers, and a platform at the rear of the frame, to which the operator may transfer his weight from the seat, substantially as herein described.

2. A rake supported upon wheels, having a frame rigidly connected and extending rearwardly from it, a transverse bar fixed to the rear end, and to which the team may be connected, a supplemental hinged lever-frame having its front end connected with the main lever or frame, and its center supported by a caster-wheel, as herein described.

In witness whereof I have hereunto set my hand.

BYRON JACKSON.

Witnesses:
S. H. NOURSE,
J. H. BLOOD.